(12) United States Patent
Vaish et al.

(10) Patent No.: US 11,126,698 B2
(45) Date of Patent: Sep. 21, 2021

(54) DISTRIBUTED LEDGER SYSTEM THAT FACILITATES DEVICE MANAGEMENT

(71) Applicant: Microsoft Technology Licensing, LLC, Redmond, WA (US)

(72) Inventors: Sonal Gaurav Vaish, Seattle, WA (US); Timothy Paul Baumann, Duvall, WA (US); Seema Lal Gulabrani, Hyderabad (IN); Brittany Jon Moore, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 301 days.

(21) Appl. No.: 16/172,543

(22) Filed: Oct. 26, 2018

(65) Prior Publication Data

US 2020/0134139 A1 Apr. 30, 2020

(51) Int. Cl.
*G06F 21/10* (2013.01)
*G06F 16/18* (2019.01)
(Continued)

(52) U.S. Cl.
CPC ........ *G06F 21/105* (2013.01); *G06F 16/1805* (2019.01); *G06F 21/335* (2013.01); *G06F 21/64* (2013.01); *H04L 9/0643* (2013.01); *H04L 67/303* (2013.01); *G06Q 50/184* (2013.01); *H04L 2209/38* (2013.01); *H04L 2209/603* (2013.01)

(58) Field of Classification Search
CPC ...... G06F 21/105; G06F 21/335; G06F 21/64; G06F 16/1805; H04L 9/0643; H04L 67/303; H04L 2209/38; H04L 2209/603; G06Q 50/184

USPC .......................................................... 705/59
See application file for complete search history.

(56) References Cited

U.S. PATENT DOCUMENTS

| 10,176,308 B2 * | 1/2019 | Mintz | H04L 9/3213 |
| 2017/0116693 A1 * | 4/2017 | Rae | H04L 9/3236 |

(Continued)

OTHER PUBLICATIONS

Thorwirth, "The De-centralized Rights Locker", SMPTE Meeting Presentation, Oct. 10, 2018, 11 pages (Year: 2018).*

(Continued)

*Primary Examiner* — James D Nigh
(74) *Attorney, Agent, or Firm* — Ray Quinney & Nebeker, P.C.; Thomas M. Hardman; Phong T. Dinh

(57) ABSTRACT

A distributed ledger system includes a device registry and a software registry. The device registry includes a plurality of device identifiers. Each device identifier uniquely identifies a device that has been registered with the distributed ledger system. The software registry includes a plurality of software license identifiers. Each software license identifier uniquely identifies a software license that has been registered with the distributed ledger system. The distributed ledger system also includes transaction management components that are configured to record device transaction information associated with the plurality of devices and software transaction information associated with the plurality of software licenses. The distributed ledger system also includes access control components that are configured to enforce access control policies related to the plurality of devices and the plurality of software licenses.

17 Claims, 8 Drawing Sheets

(51) Int. Cl.
G06F 21/33 (2013.01)
G06F 21/64 (2013.01)
H04L 9/06 (2006.01)
H04L 29/08 (2006.01)
G06Q 50/18 (2012.01)

(56) References Cited

U.S. PATENT DOCUMENTS

| | | | |
|---|---|---|---|
| 2017/0279774 A1 | 9/2017 | Booz et al. | |
| 2018/0089256 A1 | 3/2018 | Wright, Sr. | |
| 2019/0229890 A1* | 7/2019 | Brehmer | H04L 9/3242 |
| 2019/0273617 A1* | 9/2019 | Maher | H04L 9/085 |
| 2019/0303623 A1* | 10/2019 | Reddy | G06F 11/3692 |
| 2020/0401678 A1* | 12/2020 | Salomon | G06F 21/16 |

OTHER PUBLICATIONS

Herbert, et al., "A Novel Method for Decentralised Peer-to-Peer Software License Validation using Cryptocurrency Blockchain Technology", In Proceedings of the 38th Australasian Computer Science Conference, Jan. 27, 2015, pp. 27-35.

"International Search Report and Written Opinion Issued in PCT Application No. PCT/US2019/056840", dated Feb. 4, 2020, 11 Pages.

"Blockchain Operating System", Retrieved From: https://web.archive.org/web/20180713215932/https://www.investopedia.com/terms/b/blockchain-operating-system.asp, Jul. 13, 2018, 3 Pages.

"Open Registry for IoT Creating an Immutable and Interoperable Digital Identity for Real World Things", In White Paper, Aug. 15, 2016, 30 Pages.

Bell, et al., "Applications of Blockchain Within Healthcare", In Journal of Blockchain in Healthcare Today, May 29, 2018, 7 Pages.

Forres, Conner, "Chronicled Releases Open Registry for IoT Built on Blockchain", Retrieved From: https://www.techrepublic.com/article/chronicled-releases-open-registry-for-iot-built-on-blockchain/, Aug. 24, 2016, 11 Pages.

Jesus, et al., "A Survey of How to Use Blockchain to Secure Internet of Things and the Stalker Attack", In Journal of Security and Communication Networks, Apr. 8, 2018, 27 Pages.

Kshetri, Nir, "Using Blockchain to Secure the 'Internet of Things'", Retrieved From: http://theconversation.com/using-blockchain-to-secure-the-internet-of-things-90002, Mar. 7, 2018, 3 Pages.

Kulkarni, Ajit, "Blockchain in the Warranty Industry", Retrieved From: https://hackernoon.com/blockchain-in-the-warranty-industry-fe14bbbd44fa, May 5, 2018, 4 Pages.

Langberg, Ehud, "Blockchains in Mobile Networks", Retrieved From: https://e.huawei.com/in/publications/global/ict_insights/201703141505/core-competency/201703150928, Mar. 2017, 9 Pages.

Lombardo, Hans, "Blockchain Serves as Tool for Human, Product and IoT Device Identity Validation", Retrieved From: https://inform.tmforum.org/features-and-analysis/2016/11/blockchain-serves-tool-human-product-iot-device-identity-validation/, Nov. 30, 2016, 5 Pages.

* cited by examiner

DISTRIBUTED LEDGER SYSTEM THAT FACILITATES DEVICE MANAGEMENT

CROSS-REFERENCE TO RELATED APPLICATIONS

N/A

BACKGROUND

Computing devices affect nearly every aspect of modern living. There are many different types of computing devices in use today, including desktop computers, laptop computers, tablet computers, smartphones, virtual reality headsets, wearable computing technology, and the like. However, there is not currently a mechanism for tracking computing devices that is accessible to different entities that are involved in the production and maintenance of such computing devices (e.g., device manufacturers, software vendors, service providers). This makes it difficult for such entities to efficiently share relevant device data with one another. There is also not currently any mechanism for efficiently and reliably ensuring that the device data stored by a particular entity is accurate and consistent with the device data stored by other entities.

A distributed ledger is a collection of replicated and synchronized data that is spread across multiple nodes in a peer-to-peer network and that can record transactions between two parties in a verifiable way. Each node replicates and saves an identical copy of the data and updates itself independently. Records are not communicated to the various nodes by a central authority. Instead, when a ledger update happens, each node constructs the new transaction and the nodes vote by consensus algorithm on which copy is correct. Once a consensus has been determined, all the other nodes update themselves with the new, correct copy of the ledger.

A distributed ledger system is resistant to modification of the data. A consensus protocol may be agreed to by all participating members of the distributed ledger system to ensure that the ledger is updated only with network-verified transactions. This allows the participants to verify and audit transactions inexpensively. A distributed ledger system may utilize a cryptographic algorithm to ensure that updates and modifications to the system are appended to existing data (instead of erasing or removing existing data).

A blockchain system is one example of a distributed ledger system. There are several different ways to implement a blockchain system. In one example, a blockchain system includes a growing list of records, called blocks, which are linked using cryptography. Each block may include cryptographic information (e.g., a cryptographic hash) corresponding to the previous block, a timestamp, and information about one or more transactions. In these implementations, a record cannot be altered retroactively without the alteration of all subsequent blocks and the consensus of the network.

SUMMARY

In accordance with an aspect of the present disclosure, a distributed ledger system is disclosed that is configured to facilitate device management. The distributed ledger system includes one or more processors and memory in electronic communication with the one or more processors. The distributed ledger system may also include a device registry, a software registry, transaction management components, and access control components stored in the memory. The device registry may include a plurality of device identifiers, each device identifier uniquely identifying a device that has been registered with the distributed ledger system. The software registry may include a plurality of software license identifiers, each software license identifier uniquely identifying a software license that has been registered with the distributed ledger system. The transaction management components may be executable by the one or more processors to record, in a distributed ledger that is maintained by the distributed ledger system, device transaction information associated with the plurality of devices and software transaction information associated with the plurality of software licenses. The access control components may be executable by the one or more processors to enforce access control policies related to the plurality of devices and the plurality of software licenses.

A plurality of device tokens may be stored in the memory, each device token being associated with a registered device. The plurality of device tokens may be executable by the one or more processors to perform one or more of changing ownership of the device tokens, recording the device transaction information in the device registry, and enforcing device access control policies associated with the device tokens.

A plurality of software license tokens may be stored in the memory, each software license token being associated with a registered software license. The plurality of software license tokens may be executable by the one or more processors to perform one or more of changing ownership of the software license tokens, recording the software transaction information in the software registry, enforcing software access control policies associated with the software license tokens, and tracking consumption of licensed software products on the plurality of devices.

Recording the device transaction information and recording the software license transaction information may include associating a device token with a software license token in response to a purchase of a registered software license for a registered device. The registered device may be associated with the device token, and the registered software license may be associated with the software license token.

Changing the ownership of the device tokens may include changing an owner identifier associated with a device token in response to a change in ownership of a registered device, the registered device being associated with the device token.

Changing the ownership of the software license tokens may include changing an owner identifier associated with a software license token in response to a purchase of a registered software license, the registered software license being associated with the software license token.

Enforcing the device access control policies associated with the device tokens may include at least one of restricting visibility of a device token within the distributed ledger system or defining one or more users who are authorized to modify attributes of the device token and record transactions associated with the device token.

Enforcing the software access control policies associated with the software license tokens may include at least one of restricting visibility of a software license token within the distributed ledger system or defining one or more users who are authorized to modify attributes of the software license token and record transactions associated with the software license token.

The distributed ledger system may further include an application programming interface corresponding to the distributed ledger system and a user interface that facilitates access to data maintained by the distributed ledger system via the application programming interface.

In accordance with another aspect of the present disclosure, a method for facilitating device management through use of a distributed ledger system is disclosed. The method may include registering a plurality of devices with the distributed ledger system and creating a plurality of device identifiers for the plurality of devices. Each device identifier may uniquely identify a device that has been registered with the distributed ledger system. The method may also include registering a plurality of software licenses with the distributed ledger system and creating a plurality of software license identifiers for the plurality of software licenses. Each software license identifier may uniquely identify a software license that has been registered with the distributed ledger system. The method may also include recording device transaction information associated with the plurality of devices in a device registry, recording software transaction information associated with the plurality of software licenses in a software registry, and enforcing access control policies related to the plurality of devices and the plurality of software licenses.

The method may further include creating a plurality of device tokens and creating a plurality of software license tokens. Each software license token may be associated with a registered software license. Each device token may be associated with a registered device.

The method may further include managing ownership of the plurality of device tokens. Managing the ownership of the plurality of device tokens may include changing an owner identifier associated with a device token in response to a purchase of a registered device, the registered device being associated with the device token.

The method may further include managing ownership of the plurality of software license tokens. Managing the ownership of the plurality of software license tokens may include changing an owner identifier associated with a software license token in response to a purchase of a registered software license, the registered software license being associated with the software license token.

Enforcing the access control policies related to the plurality of devices may include at least one of restricting visibility of a device token within the distributed ledger system or defining one or more users who are authorized to modify attributes of the device token and record transactions associated with the device token.

Enforcing the access control policies related to the plurality of software licenses may include at least one of restricting visibility of a software license token within the distributed ledger system or defining one or more users who are authorized to modify attributes of the software license token and record transactions associated with the software license token.

Recording the device transaction information and recording the software transaction information may include associating a device token with a software license token in response to a purchase of a registered software license for a registered device. The registered device may be associated with the device token, and the registered software license may be associated with the software license token.

The method may further include exposing an application programming interface corresponding to the distributed ledger system and providing a user interface that facilitates access to data maintained by the distributed ledger system via the application programming interface.

In accordance with another aspect of the present disclosure, a computer-readable medium is disclosed that includes computer-executable instructions stored thereon. When executed, the instructions cause one or more processors to perform operations including registering a plurality of devices with a distributed ledger system and creating a plurality of device identifiers for the plurality of devices. Each device identifier may uniquely identify a device that has been registered with the distributed ledger system. The operations may also include registering a plurality of software licenses with the distributed ledger system and creating a plurality of software license identifiers for the plurality of software licenses. Each software license identifier may uniquely identify a software license that has been registered with the distributed ledger system. The operations may also include recording device transaction information associated with the plurality of devices in a device registry, recording software transaction information associated with the plurality of software licenses in a software registry, and enforcing access control policies related to the plurality of devices and the plurality of software licenses.

The operations may further include creating a plurality of device tokens and creating a plurality of software license tokens. Each device token may be associated with a registered device. Each software license token may be associated with a registered software license.

Recording the device transaction information and recording the software transaction information may include associating a device token with a software license token in response to a purchase of a registered software license for a registered device. The registered device may be associated with the device token. The registered software license may be associated with the software license token.

DETAILED DESCRIPTION

The present disclosure is generally related to a distributed ledger system, such as a blockchain system, that is configured to facilitate management of electronic devices. In accordance with the present disclosure, a registry may be created for storing information about devices and the software products that are installed on them. This registry may be implemented as a distributed ledger that is replicated and synchronized across multiple nodes in a peer-to-peer network. Devices may be added to the global registry when they are manufactured or at any subsequent point in time. When a transaction occurs that is related to a registered device (e.g., when a software product is installed on the device, when ownership of the device changes) the transaction may be recorded in the global registry. Because a distributed ledger system allows participants to verify and audit transactions, the global registry may be considered to be a reliable source of information for all of the devices that are being tracked. This may facilitate greater trust and interaction between various entities who are involved in the production and maintenance of computing devices (e.g., device manufacturers, software vendors, customers).

The techniques disclosed herein may be used to track any type of computing or electronic device. Some examples of computing or electronic devices that may be tracked in accordance with the techniques disclosed herein include desktop computers, laptop computers, tablet computers, mobile devices (e.g., smartphones), wearable computing devices (e.g., smartwatches, fitness trackers), gaming consoles, and Internet of Things (IoT) devices.

The techniques disclosed herein are applicable to any type of distributed ledger system. A blockchain system is one example of a distributed ledger system, and the techniques disclosed herein may be implemented in a blockchain system. However, the present disclosure is not limited to any particular implementation of a blockchain system. Therefore, the present disclosure will be described in terms of a distributed ledger system.

Figure 1:
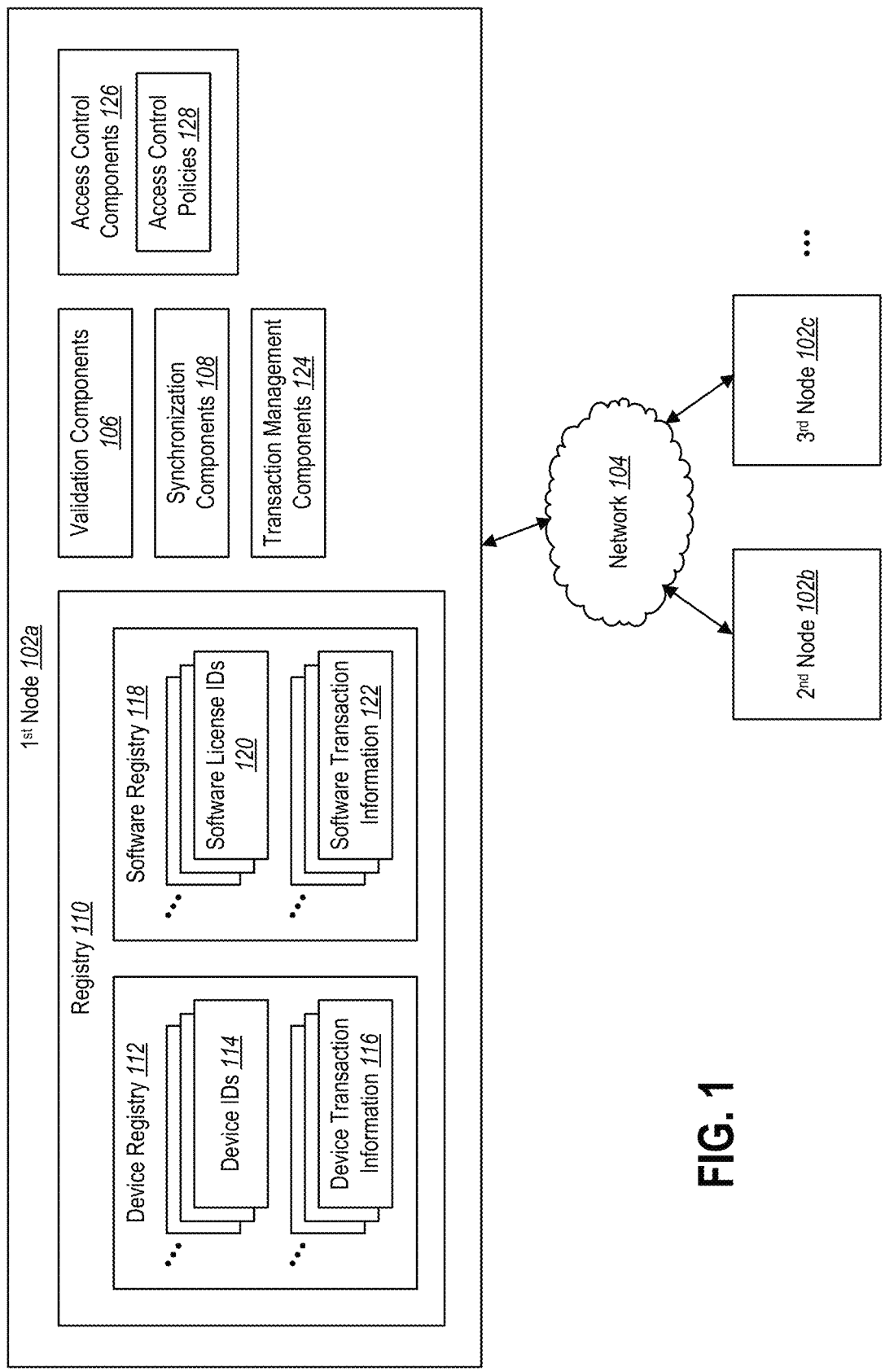
FIG. 1 illustrates an example of a distributed ledger system that is configured to facilitate device management in accordance with the present disclosure.

FIG. 1 illustrates an example of a distributed ledger system 100 that is configured to facilitate device management in accordance with the present disclosure. The system 100 includes a registry 110 for storing information about devices and the software products that are installed on them. The registry 110 is implemented as a distributed ledger that is replicated across a plurality of nodes 102a-c, which may be in communication with one another via one or more networks 104 (which may include the Internet). The various nodes 102a-c may form a peer-to-peer network, in which the nodes 102a-c share resources among each other without the use of a centralized administrative system. For the sake of simplicity, only three nodes 102a-c are shown in the system 100 of FIG. 1. A system in accordance with the present disclosure, however, may include many more than three nodes. Also, for simplicity, only the contents of the first node 102a are shown in FIG. 1. However, the other nodes 102b-c may be configured similarly to the first node 102a. In other words, the other nodes 102b-c may also include a copy of the distributed ledger.

The nodes 102a-c may each include validation components 106 that implement a consensus protocol, which ensures that the nodes 102a-c in the system 100 verify and approve of any updates that are made to the distributed ledger. The nodes 102a-c may also each include synchronization components 108, which synchronize the copies of the distributed ledger on the various nodes 102a-c with one another.

The registry 110 includes a device registry 112 that includes information about devices that have been registered with the distributed ledger system 100. The device registry 112 includes a plurality of device identifiers 114 corresponding to registered devices. Each device identifier (ID) 114 uniquely identifies a registered device. The device registry 112 also includes device transaction information 116 associated with the registered devices. The device transaction information 116 includes information about transactions that take place with respect to registered devices, such as when a device is manufactured, when software products are installed on a registered device, when ownership of a registered device changes, etc.

The registry 110 also includes a software registry 118 that includes information about licenses for software products that have been registered with the distributed ledger system 100. The software registry 118 includes a plurality of software license IDs 120 corresponding to registered software licenses. Each software license ID 120 uniquely identifies a registered software license. The software registry 118 also includes software transaction information 122 associated with the registered software licenses. The software transaction information 122 includes information about transactions that take place with respect to registered software licenses, such as when a licensed software product is installed on a registered device, when ownership of a registered software license changes, etc.

The nodes 102a-c each include transaction management components 124 that permit authorized users to view and record the device transaction information 116 associated with registered devices and the software transaction information 122 associated with registered software licenses. To ensure that only authorized users are permitted to access and make changes or additions to information contained in the registry 110, the nodes 102a-c each include access control components 126 that enforce access control policies 128 related to registered devices and registered software licenses. The access control policies 128 include rules about which users are permitted to view and record device transaction information 116 and software transaction information 122.

Figure 2:
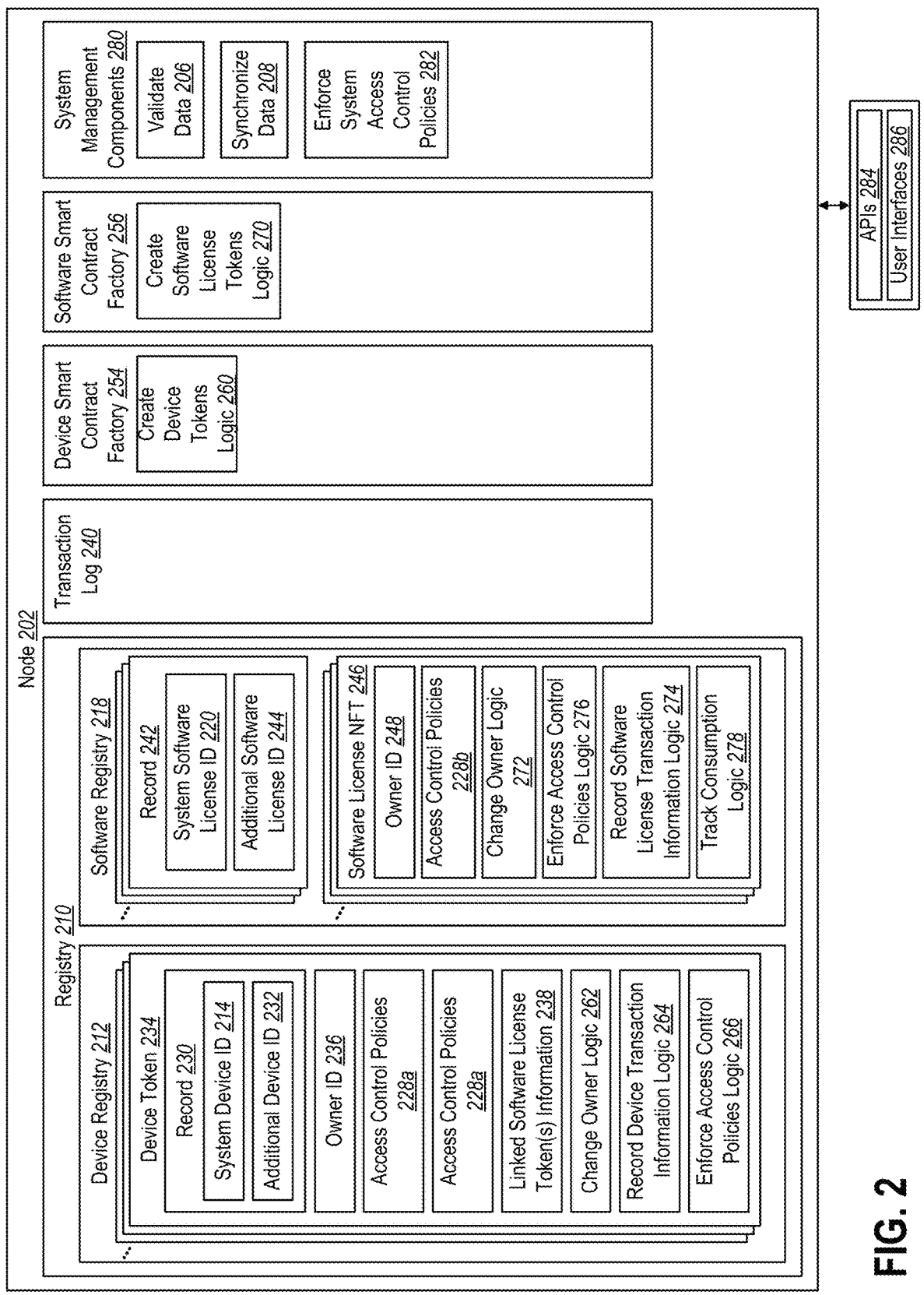
FIG. 2 is an example of a node that may be included in a distributed ledger system in accordance with the present disclosure.

FIG. 2 is a more detailed example of a node 202 that may be included in a distributed ledger system 100 in accordance with the present disclosure. The node 202 includes a registry 210, which includes a device registry 212 and a software registry 218.

The device registry 212 includes a plurality of device tokens 234. In the context of a distributed ledger system 100, such as a blockchain system, a token is a representation of a particular asset. In a distributed ledger system 100 that facilitates device management in accordance with the present disclosure, a device token 234 represents a device that has been registered with the distributed ledger system 100. Each device token 234 may be implemented using one or more data structures. More specifically, each device token 234 may be implemented using one or more token structures. In this context, the term "token structure" refers to a technical standard that is used to implement a token. Some examples of such standards include ERC-721 and ERC-20 (where "ERC" stands for Ethereum Request for Comment).

A device token 234 that represents a particular device includes certain types of information about that device. For example, a device token 234 that represents a device may include a record 230 that links or associates a system device ID 214 for the device with an additional device ID 232 for the device. The system device ID 214 may be assigned by the distributed ledger system 100 and may uniquely identify the device within the distributed ledger system 100. The additional device ID 232 may be another identifier that is assigned to and associated with the device outside of the distributed ledger system 100.

The device token 234 corresponding to a particular device may also include an owner ID 236 that identifies the current owner of the device. The device token 234 may also include information about access control policies 228a that have been defined for the device. The access control policies 228a may indicate who is authorized to perform certain actions that can be taken with respect to the device token 234 (e.g., viewing the device token 234, adding or modifying information associated with the device token 234, transferring ownership of the device token 234). The device token 234 may also include information 238 about software license non-fungible tokens (NFTs) 246 (which represent software licenses, as will be discussed below) that have been linked or associated with the device token 234.

The software registry 218 may include a plurality of records 242 that link or associate a system software license ID 220 with an additional software license ID 244. The system software license ID 220 may be assigned by the distributed ledger system 100 and may uniquely identify a registered software license within the distributed ledger system 100. The additional software license ID 244 may be another identifier that is assigned to and associated with the software license outside of the distributed ledger system 100.

The software registry 218 may also include a plurality of software license NFTs 246. The software license NFTs 246 are similar to device tokens 234, except that the software license NFTs 246 represent software licenses instead of devices. A software license NFT 246 that represents a particular software license includes certain types of information about that software license. For example, the software license NFT 246 corresponding to a particular software license may also include an owner ID 248, which identifies the current owner of the software license.

The software license NFT 246 may also include information about access control policies 228b that have been defined for the software license. The access control policies 228b may indicate who is authorized to perform certain actions that can be taken with respect to the software license NFT 246 (e.g., viewing the software license NFT 246, adding or modifying information associated with the software license NFT 246, transferring ownership of the software license NFT 246).

The device tokens 234 and software license NFTs 246 are examples of smart contracts. In the context of a distributed ledger system 100, such as a blockchain system, a smart contract may include logic that facilitates, verifies, and/or enforces rules that have been agreed upon by participants in the distributed ledger system 100. Each device token 234 may include logic that facilitates, verifies, and/or enforces rules that are related to devices. Similarly, each software license NFT 246 may include logic that facilitates, verifies, and/or enforces rules that are related to software licenses.

For example, each device token 234 may include logic 262 that enables the owner ID 236 to be changed. The owner ID 236 may be changed, for example, in response to a change in the ownership of the corresponding device (e.g., when some entity, such as an enterprise or a consumer, purchases a device).

Each device token 234 may also include logic 264 that records information about transactions that have taken place with respect to the corresponding registered device. For example, when a software license that has been registered with the distributed ledger system 100 is purchased for a device that has been registered with the distributed ledger system 100, a software license NFT 246 that is associated with the registered software license may be linked or associated with a device token 234 that is associated with the registered device. The device token 234 may include logic 264 that associates certain information 238 about the linked software license NFT 246 with the device token 234. The logic 264 may also add one or more entries to a transaction log 240 (which will be described below).

Each device token 234 may also include logic 266 that enforces access control policies 228a associated with the device token 234. Enforcing access control policies 228a associated with a device token 234 may involve restricting the visibility of the device token 234 so that only authorized users are permitted to view the device token 234. Enforcing access control policies 228a associated with a device token 234 may also involve defining one or more users who are authorized to modify attributes of the device token 234 and record transactions associated with the device token 234.

Similarly, each software license NFT 246 may also include logic 272 that enables the owner ID 248 to be changed. The owner ID 248 may be changed, for example, in response to a change in the ownership of the corresponding software license (e.g., when some entity, such as an enterprise or a consumer, purchases a software license).

Each software license NFT 246 may also include logic 276 that enforces access control policies 228b associated with the software license NFTs 246. Enforcing access control policies 228b associated with a software license NFT 246 may involve restricting the visibility of the software license NFT 246 so that only authorized users are permitted to view the software license NFT 246. Enforcing access control policies 228b associated with a software license NFT 246 may also involve defining one or more users who are authorized to modify attributes of the software license NFT 246 and/or record transactions associated with the software license NFT 246.

Each software license NFT 246 may also include logic 274 that records information about transactions that have taken place with respect to the corresponding registered software license. For example, as noted above, when a software license that has been registered with the distributed ledger system 100 is purchased for a device that has been registered with the distributed ledger system 100, a software license NFT 246 that is associated with the registered software license may be linked or associated with a device token 234 that is associated with the registered device. When this occurs, the logic 274 associated with the software license NFT 246 may add one or more entries to a transaction log 240 (which will be described below).

Each software license NFT 246 may also include logic 278 that tracks consumption of the corresponding licensed software product on one or more registered devices. This may include providing reports about the installation of the licensed software product on one or more registered devices so that, for example, the appropriate associations may be made between the software license NFT 246 and the relevant device token(s) 234. In some implementations, tracking consumption of a licensed software product may also include providing reports that indicate usage patterns for the licensed software product on registered device(s) (e.g., how much a particular licensed software product has been used on a particular registered device over a defined time period).

The node 202 may also include a transaction log 240. The transaction log 240 may include information about transactions that have been performed with respect to the device tokens 234 in the device registry 212 and the software license NFTs 246 in the software registry 218. For example, whenever a transaction is performed that links or associates a software license NFT 246 with a device token 234, information about the transaction may be recorded in the transaction log 240.

In the depicted example, the transaction log 240 is shown separately from the registry 210. In an alternative embodiment, however, the transaction log 240 may be included in one or more components within the registry 210. For example, in some embodiments, each device token 234 may include a transaction log for recording transactions involving the corresponding device and each software license NFT 246 may include a transaction log for recording transactions involving the corresponding software license.

The node 202 may include a device smart contract factory 254 that is configured to register devices, i.e., deploy device tokens 234 within the distributed ledger system 100. The device smart contract factory 254 may include logic 260 that creates device tokens 234. A device token 234 corresponding to a particular device may be created when that device is registered with the distributed ledger system 100. This may occur, for example, when a device is manufactured, or at any subsequent point in the lifetime of the device.

Similarly, the node 202 may include a software smart contract factory 256 that is configured to generate software license NFTs 246, i.e., deploy software license NFTs 246 within the distributed ledger system 100. The software smart contract factory 256 may include logic 270 that creates software license NFTs 246. A software license NFT 246 corresponding to a particular software license (or a set of multiple software licenses) may be created when a software product is registered with the distributed ledger system 100. For example, when a software vendor releases a particular software product, the software vendor may register the software product with the distributed ledger system 100 and make a certain number of licenses available for that software product. A software license NFT 246 may be created for each of these licenses.

The node 202 may also include system management components 280 that perform certain functions with respect to management of the distributed ledger system 100. For example, the system management components 280 may include one or more components 206 for validating transactions in accordance with a consensus protocol and one or more components 208 for synchronizing data with other nodes in the distributed ledger system 100. The system management components 280 may also include one or more components 282 that enforce system access control policies. These policies may limit or restrict access to the distributed ledger system 100 to authorized users.

In some implementations, all of the participants in the distributed ledger system 100 (e.g., device manufacturers, software vendors, enterprise customers) may each maintain a node, such as the node 202 shown in FIG. 2. However, other entities who do not have the resources to manage their own nodes may also wish to access data in the distributed ledger system 100. To facilitate such access, an entity that maintains a node 202 in the distributed ledger system 100 may also provide one or more application programming interfaces (APIs) 284 corresponding to the distributed ledger system 100. One or more user interfaces 286 may also be provided. The UIs 286 may facilitate access to data maintained by the distributed ledger system 100 via the APIs 284.

Figure 3A:
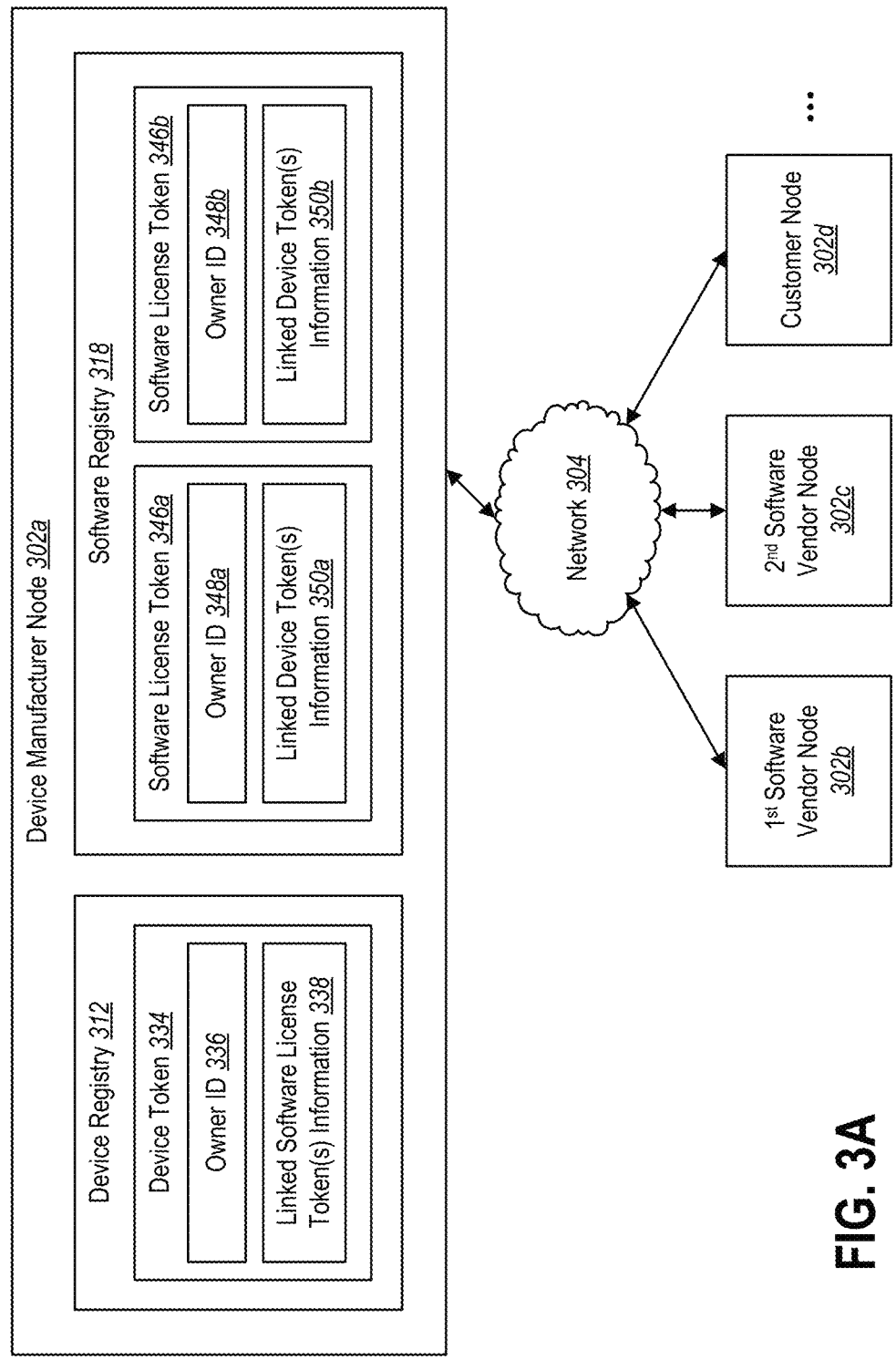
FIGS. 3A-B illustrate an example that shows how a distributed ledger system in accordance with the present disclosure may be utilized.

An example that shows how a distributed ledger system 300 in accordance with the present disclosure may be utilized will be discussed in relation to FIGS. 3A-B. Reference is initially made to FIG. 3A, which illustrates a distributed ledger system 300 that includes a plurality of nodes 302a-d. More specifically, the distributed ledger system 300 includes a node 302a that is associated with a device manufacturer, nodes 302b-c that are associated with first and second software vendors, respectively, and a node 302d that is associated with a customer (i.e., an entity that purchases devices made by the device manufacturer and/or software products created by the software vendors).

Several components that are relevant to the example are shown on the device manufacturer node 302a, including a device registry 312 and a software registry 318. The device registry 312 is shown with a device token 334 corresponding to a device made by the device manufacturer. The software registry 318 includes a software license token 346a for a first software product (which will be referred to as software product A) made by the first software vendor and a software license token 346b for a second software product (which will be referred to as software product B) made by the second software vendor. Although the other nodes 302b-d include components that are similar to the ones shown on the device manufacturer node 302a, for the sake of simplicity they are not shown in FIG. 3A.

Figure 3B:
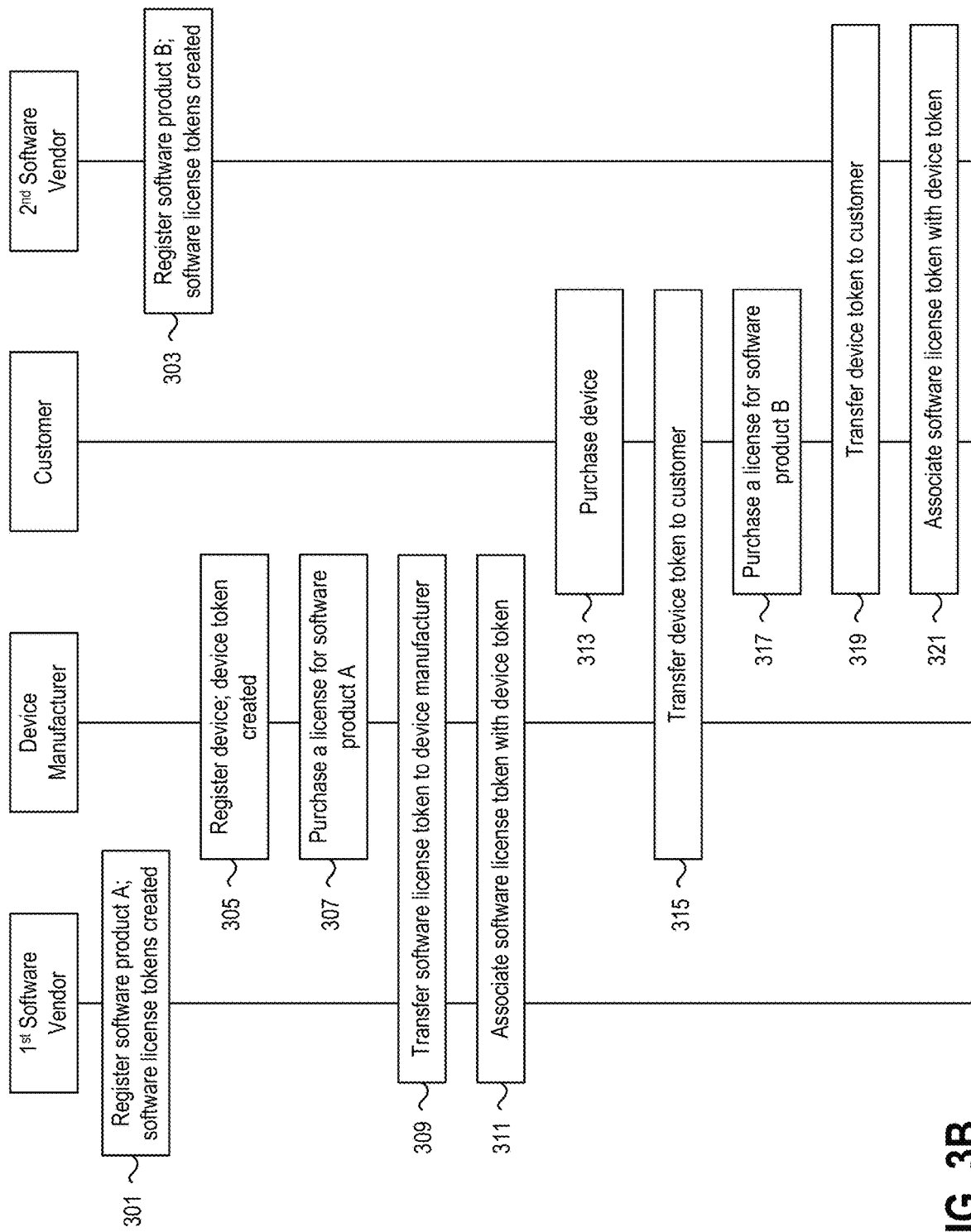

Referring now to FIG. 3B, when the first software vendor creates software product A, the first software vendor may register 301 software product A with the distributed ledger system 300 and make licenses available for software product A. In response, software license tokens 346a corresponding to the licenses may be created and added to the software registry 318.

Similarly, when the second software vendor creates software product B, the second software vendor may register 303 software product B with the distributed ledger system 300 and make licenses available for software product B. In response, software license tokens 346b corresponding to the licenses may be created and added to the software registry 318.

When a device is manufactured, the device manufacturer may register 305 the device with the distributed ledger system 300. In response, a device token 334 corresponding to the device may be created and added to the device registry 312.

If the device manufacturer wants to sell the device with software product A already installed on the device, the device manufacturer may purchase 307 a license for software product A from the first software vendor. In response, the first software vendor may transfer 309 a software license token 346a corresponding to the purchased license to the device manufacturer. The owner ID 348a associated with the software license token 346a may be updated to reflect the change in ownership. In addition, the software license token 346a may be associated 311 with the device token 334 via information 338, 350a that is recorded in the device registry 312 and the software registry 318.

At some point, a customer may purchase 313 the device. (For simplicity, it will be assumed that the customer purchases the device from the device manufacturer. However, the customer may purchase the device from another entity.) In response, the device manufacturer may transfer 315 the device token 334 corresponding to the device to the customer. The owner ID 336 associated with the device token 334 may be updated to reflect the change in ownership.

The customer may purchase 317 a license for software product B from the second software vendor. In response, the second software vendor may transfer 319 a software license token 346b corresponding to the purchased license to the customer. The owner ID 348b associated with the software license token 346b may be updated to reflect the change in ownership. In addition, the software license token 346b may be associated 321 with the device token 334 via information 338, 350b that is recorded in the device registry 312 and the software registry 318.

Figure 4:
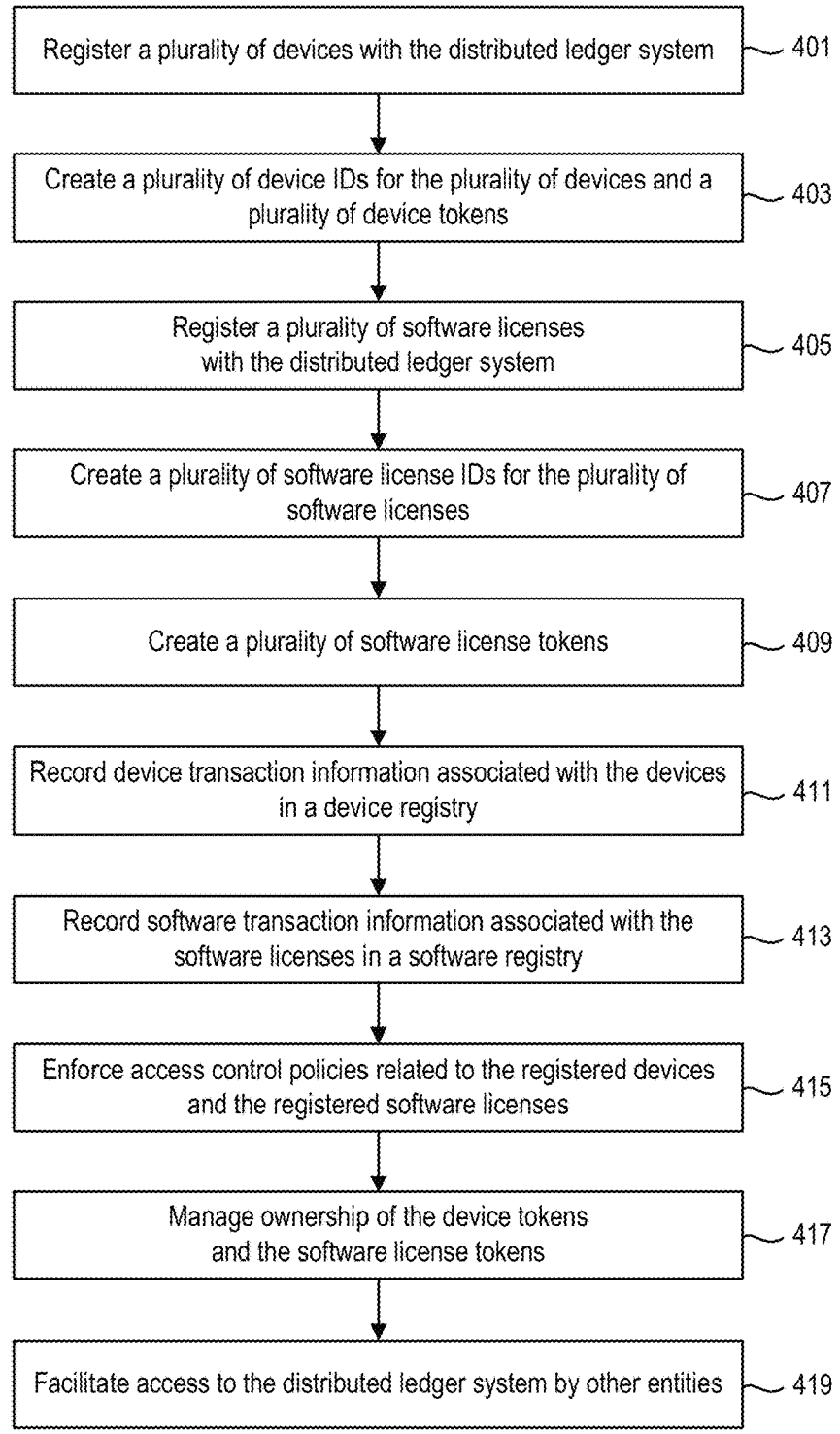
FIG. 4 is a flow diagram that illustrates a method for facilitating device management through use of a distributed ledger system in accordance with the present disclosure.

FIG. 4 is a flow diagram that illustrates a method 400 for facilitating device management through use of a distributed ledger system in accordance with the present disclosure. The method 400 will be discussed in relation to the distributed ledger system 100 shown in FIG. 1 and the node 202 shown in FIG. 2.

The method 400 includes registering 401 a plurality of devices with the distributed ledger system 100. Registering 401 the plurality of devices may include creating 403 a plurality of device IDs 114 for the plurality of devices and a plurality of device tokens 234. Each device ID 114 may uniquely identify a device that has been registered with the distributed ledger system 100. Each device token 234 may be associated with a registered device. A separate device token 234 may be created for each registered device.

The method 400 also includes registering 405 a plurality of software licenses with the distributed ledger system 100. Registering 405 the plurality of software licenses may include creating 407 a plurality of software license IDs 120 for the plurality of software licenses. Each software license ID 120 may uniquely identify a software license that has been registered with the distributed ledger system 100. Registering 405 the plurality of software licenses may also include creating 409 a plurality of software license NFTs 246. Each software license NFT 246 may be associated with a registered software license.

The method 400 also includes recording 411 device transaction information 116 associated with the registered devices in a device registry 112, and recording 413 software transaction information 122 associated with the registered software licenses in a software registry 118. This may involve associating a device token 234 with a software license NFT 246 in response to a purchase of a registered software license (associated with the software license NFT 246) for a registered device (associated with the device token 234).

The method 400 also includes enforcing 415 access control policies 128 related to the registered devices and the registered software licenses. This may include restricting visibility of one or more device tokens 234 and/or one or more software license NFTs 246 within the distributed ledger system 100. As another example, enforcing 415 access control policies 128 may include defining one or more users who are authorized to perform actions such as modifying attributes of the device tokens 234, recording transactions associated with the device tokens 234, modifying attributes of the software license NFTs 246, and/or recording transactions associated with the software license NFTs 246.

The method 400 also includes managing 417 ownership of the device tokens 234 and the software license NFTs 246. Managing 417 ownership of a particular device token 234 may include changing an owner ID 236 associated with the device token 234 in response to a purchase of a registered device that is associated with the device token 234. Similarly, managing 417 ownership of a particular software license NFT 246 may include changing an owner ID 248 associated with the software license NFT 246 in response to a purchase of a registered software license that is associated with the software license NFT 246.

The method 400 also includes facilitating 419 access to the distributed ledger system 100 by other entities who may not have the resources to manage their own nodes. This may involve exposing one or more APIs 284 corresponding to the distributed ledger system 100 and providing one or more user interfaces 286 that facilitate access to data maintained by the distributed ledger system 100 via the API(s) 284.

Another example will now be described in relation to FIGS. 5A-C. In this example, physical devices and software licenses may be managed through smart contracts with a built-in object hierarchy and software license NFTs that represent a unique subscription for a unique device account. Once deployed, smart contracts may be identified within the distributed ledger system by an account number. Two broad classifications of smart contracts may be used: identity contracts 597 (which may be referred to herein simply as "accounts"), and functional contracts 598 (which may be referred to herein simply as "contracts").

In this example, a smart contract may be an autonomous object containing an internal ledger of addresses each with a unique balance mapped to a token ID. In this context, the term "address" may refer to a notation (e.g., a hexadecimal notation) corresponding to the public key of an entity, where an entity could be an identity contract 597 (corresponding to an account holder within the distributed ledger system) or a functional contract 598.

Figure 5A:
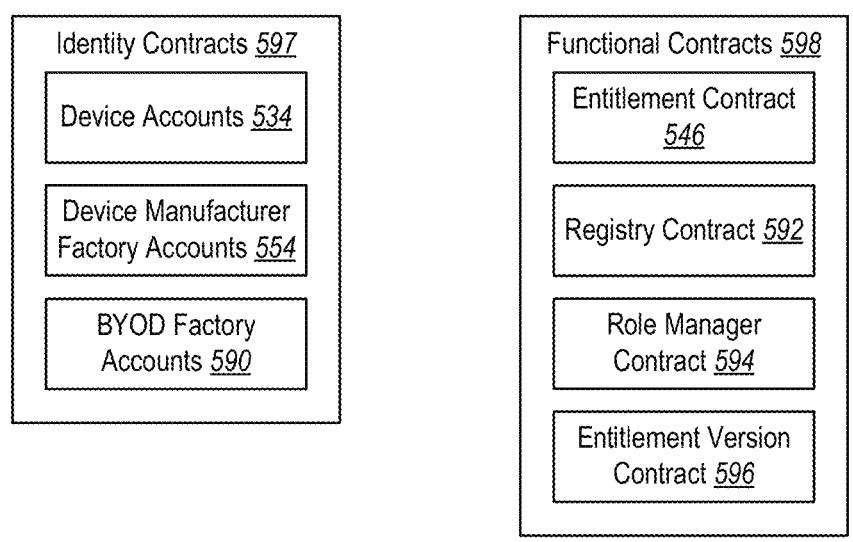
FIGS. 5A-C illustrate how physical devices and software licenses may be managed through smart contracts.

As shown in FIG. 5A, different types of identity contracts 597 (accounts) may be defined for a distributed ledger system in accordance with the present disclosure. Some examples of identity contracts 597 include device accounts 534, device manufacturer factory accounts 554, and bring your own device (BYOD) factory accounts 590.

A device account 534 may be an identifying account for an individual device whose functions are called by its owner. There may be one device account 534 for every device that is being tracked within the distributed ledger system. Controls associated with a device account 534 may include entitlement contracts and the ability to transfer ownership. A device account 534 may be generated by a device manufacturer factory account 590 and may be owned by an organization. An event log may be associated with a device account 534.

A device manufacturer factory account 554 may be an organizational level contract used by a device manufacturer to deploy and look up device contracts in a deterministic manner. There may be one device manufacturer factory account 554 for every device manufacturer that is participating in the distributed ledger system. A device manufacturer factory account 554 may be generated by an administrator of the distributed ledger system and may be owned by an organization. An event log may be associated with a device manufacturer factory account 554.

A BYOD factory account 590 may also be an organizational or individual level contract used by a device manufacturer or an individual to deploy and look up device contracts in a deterministic manner. A BYOD factory account 590 may be generated by an administrator of the distributed ledger system and may also be owned by an administrator of the distributed ledger system. An event log may be associated with a BYOD factory account 590. A BYOD factory account 590 may be used by a device to register itself on the registry 510.

Different types of functional contracts 598 may be defined for a distributed ledger system in accordance with the present disclosure. Some examples of functional contracts include an entitlement contract 546, a registry contract 592, a role manager contract 594, and an entitlement version contract 596.

An entitlement contract 546 may be used to manage software entitlements. A software license may be responsible for entitlement creation. Entitlements may then be credited to a device account 534. A device account 534 may then be able to transfer the token they control to another device account 534 using the entitlement contract 546. The software license NFTs 246 discussed previously are examples of entitlement contracts 546. There may be one entitlement contract 546 for every software license that is being tracked within the distributed ledger system. An entitlement contract 546 may be generated and owned by a software licensor. Some controls associated with an entitlement contract 546 may include the ability to create the entitlement contract 546 (which may only be available to an owner of the entitlement contract 546), the ability to transfer and retire the entitlement contract 546 (which may be available to all approvers or owners in the distributed ledger system). An event log may be associated with an entitlement contract 546.

A registry contract 592 may contain a mapping of identifiers and devices/software licenses in the distributed ledger system. During device/software license creation (e.g., creation of a device account 534 and/or an entitlement contract 546), the registry contract 592 may be used to check availability of the software or device. A registry contract 592 may be generated by an administrator of the distributed ledger system and may also be owned by an administrator of the distributed ledger system. Controls associated with a registry contract 592 may include creation of device accounts 534 and creation of entitlement contracts 546. An event log may be associated with a registry contract 592.

A role manager contract 594 may be used for providing access control to functions associated with contracts. In other words, functional smart contracts within the distributed ledger system may be deployed with a "modifier" that restricts who is able to call its functions (e.g., to those listed as "owned by"), and the role manager contract 594 may be configured to enforce these modifiers. A role manager contract 594 may be generated by an administrator of the distributed ledger system and may also be owned by an administrator of the distributed ledger system. An event log may be associated with a role manager contract 594.

An entitlement version contract 596 may be used for versioning of software entitlement contracts. This may provide a single point of reference for devices to locate the most current version of an entitlement contract 546. There may be one entitlement version contract 596 for every software licensor that is participating in the distributed ledger system. An entitlement version contract 596 may be generated and owned by a software licensor. Some controls associated with an entitlement version contract 596 may include reading the most current entitlement contract accounts (which may be accessible to all participants in the distributed ledger system). An event log may be associated with an entitlement version contract 596.

Figure 5B:
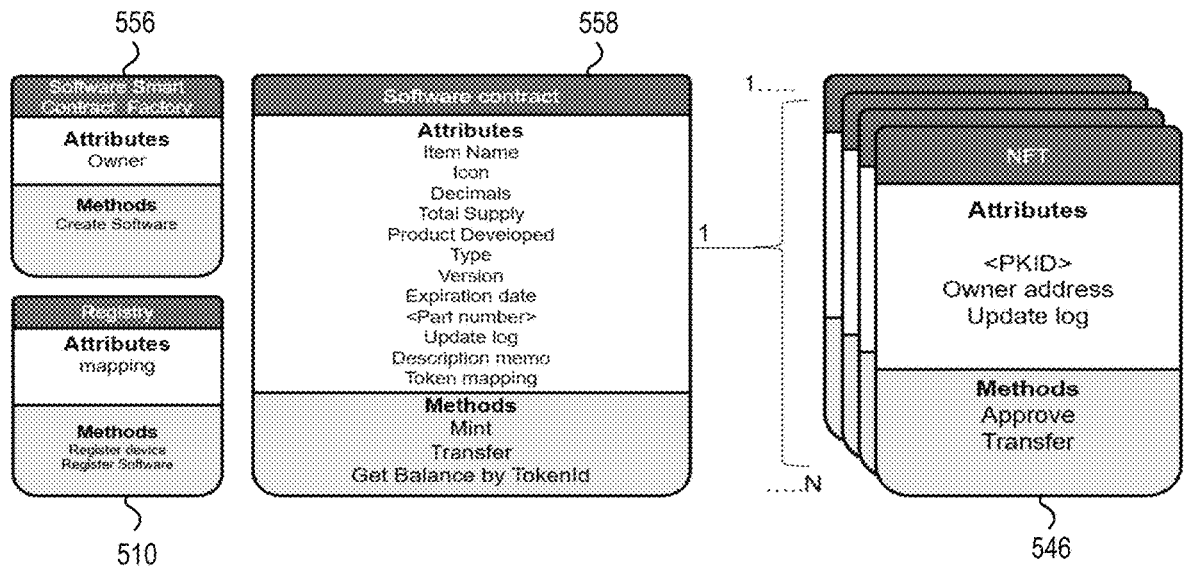
Figure 5C:
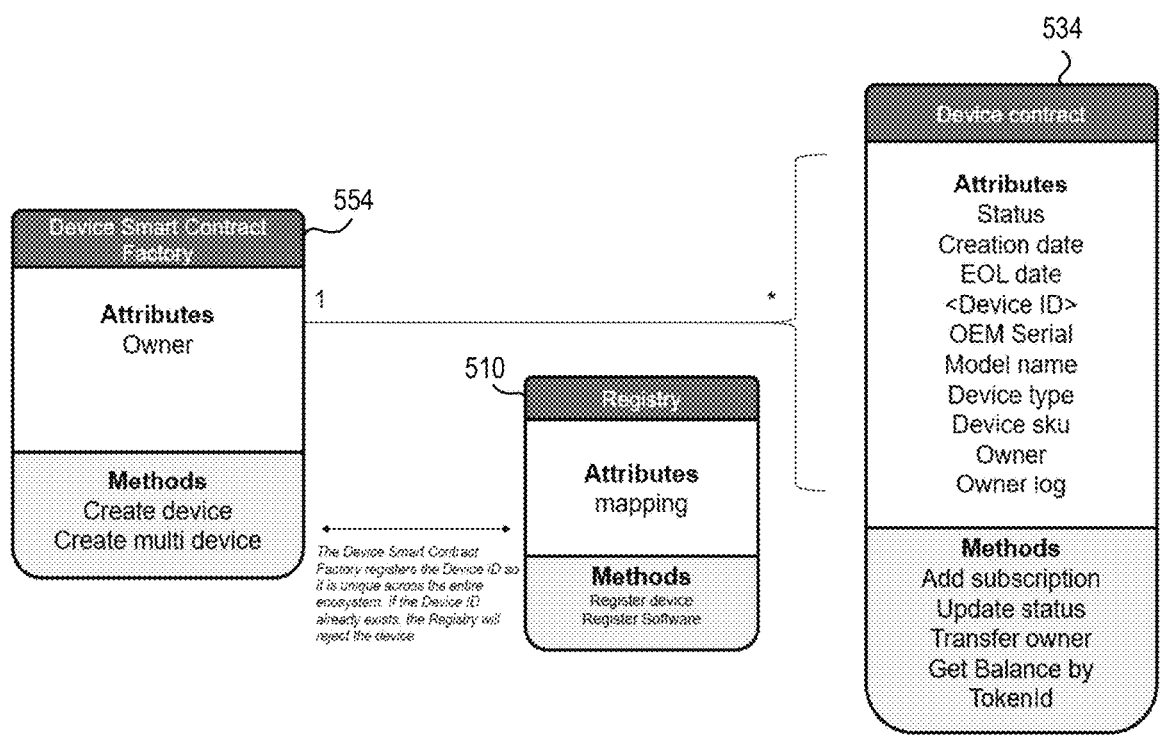

As shown in FIG. 5B, a software licensor may create a software contract 558 for each software product that they intend to license via the distributed ledger system. A software smart contract factory 556 may provide this functionality, and it may access a registry 510 in connection therewith. One or more software license NFTs 546 may be issued for each software contract 588. The initial balance of software license NFTs 546 may be added to the licensor's account. The token account may be made public by the licensor.

A software license NFT 546 may be owned by an owner account that is capable of "minting" more software license NFTs 546 (e.g., adding a non-zero value of software license NFTs 546 to their account in excess of the current balance). Each software license NFT 546 may also allow authorized members of the distributed ledger system to transfer any portion of the associated balance to any address of an organization or device. These transactions may update the internal state of the contract by sending a message to the contract address.

Each software license NFT 546 may represent a unique subscription for a unique device account. A customer account may be identified by their account number (subscription ID) and may be responsible for monitoring their balance. Each device may check the balance of their account and may send usage reports to the same.

A customer may purchase a license for the software product from the licensor. This transaction may happen through legacy channels and standard practices. It is not necessary for an account of this transaction to be directly registered with the distributed ledger system (although it could be). In response to the transaction, however, the licensor may mint new software license NFTs 546 if there are not enough software license NFTs 546 in the licensor's account. The licensor may then transfer the software license NFTs 546 to the appropriate addresses.

The licensor may then send a transaction with the token ID (which may correspond to the system software license ID 220 shown in FIG. 2) to the customer's account. The contract state may be updated to indicate that the account corresponding to the customer's device on which the software is installed has a non-zero balance. The device may then send a transaction to the enterprise account to remove an agreed-upon number of tokens from the customer's account.

For example, when customer A purchases a software product, the instance of the software contract 558 corresponding to that software product may be updated to indicate that customer A has been allotted a software product. In other words, the software contract 558 may be updated to indicate that customer A has been allotted a software license NFT 546. When customer B purchases the same product, the same instance of the software contract 558 corresponding to that software product may be updated to indicate that customer B also has been allotted the same software product. In other words, the software contract 558 may be updated to indicate that customer B has been allotted a software license NFT 546. Thus, the software contract 558 aggregates a collection of software license NFTs 546, each allotted to a customer.

A smart contract factory (e.g., the software smart contract factory 556 shown in FIG. 5B and the device smart contract factory 554 shown in FIG. 5C) may be used to deploy predefined contracts, including device contracts 534 (e.g., device tokens 234) and software license NFTs 546. As discussed above, every device and software license in the distributed ledger system may have a unique system identifier (e.g., the system device ID 214 and the system software license ID 220) that is related to the real world physical device or software identifier. In some embodiments, the system identifier may be registered globally by creating a hash value of the generic hardware identifier. During device creation, a lookup in the registry 510 may be performed. The system may be configured so that if a device ID has been registered before, the contract creation fails.

The present disclosure has provided a physical device and software license distribution solution for multi-party and multi-device tracking and authentication. A distributed ledger system in accordance with the present disclosure may be implemented using a decentralized, distributed, database system. This facilitates data and records management encompassing end-to-end process management from device provisioning to device fulfillment, product installation, and device reporting.

A distributed ledger system in accordance with the present disclosure may facilitate many new capabilities and potential interactions between various entities who are involved in the production and maintenance of computing devices (e.g., device manufacturers, software vendors, customers). For example, device manufacturers and software vendors may be able to locate more reliable information about the state of devices, including what software products are installed on those devices, via a distributed ledger system as disclosed herein. Consequently, they may be able to deliver new products and updates more efficiently to customers. As another example, billing and invoicing may be performed based on products attached and services consumed, which may make the use of some software products more cost-effective for certain types of customers. As another example, a distributed ledger system as disclosed herein may facilitate creation of a peer-to-peer marketplace that enables services and entitlements to be shared among device owners. Another example is the creation of a "device as a service" framework based on device lifecycle tracking, security patches, and managing entitlements shared across all parties (e.g., device manufacturers, software vendors, service providers). Yet another example is the creation of a framework for providing "support, repair, and warranty as a service" based on device telemetry and predictive maintenance. Many other examples are possible.

The techniques disclosed herein may provide significant technical advantages relative to known approaches. For example, there is not currently a mechanism for tracking computing devices that is accessible to different entities that are involved in the production and maintenance of such computing devices (e.g., device manufacturers, software vendors, service providers). This makes it difficult for such entities to efficiently share relevant device data with one another. For instance, a device manufacturer may have certain data about a particular device (e.g., the device's hardware specifications) and a software vendor may have certain other data about the device (e.g., the software that is installed on the device). With currently known approaches, however, the device manufacturer's data is generally not available to the software vendor, and vice versa. In accordance with the present disclosure, however, all relevant data about a device may be stored in the global registry and made available to all participants in the distributed ledger system. This makes the process of tracking devices and obtaining device data more efficient for such participants.

Another problem with known approaches is that there is not currently any mechanism for efficiently and reliably ensuring that the device data stored by a particular entity is accurate and consistent with the device data stored by other entities. In many cases, reconciliation of device data is not possible. To the extent that reconciliation of device data occurs at all, it is generally a complicated, time-consuming, and unreliable process that requires the exchange of several reports and documents between entities. In contrast, a global registry implemented as a distributed ledger system, as disclosed herein, allows participants to verify and audit transactions so that the global registry may be considered to be a reliable source of information for all of the devices that are being tracked. This makes it possible for various entities to rely on the data contained in the global registry without the need for complicated reconciliation processes and the costs associated therewith. This can significantly improve the efficiency and reduce the costs associated with provisioning new products and services for computing devices. A global registry as disclosed herein may also reduce the overall amount of storage that is required for participating entities by eliminating the need to store certain other types of (unsynchronized, unverified) data that is stored with currently known approaches. This may have the effect of reducing the overall storage costs for participating entities.

The techniques disclosed herein may also improve the efficiency of providing maintenance for computing devices and for software that is installed on those computing devices. For example, consider the process of providing software updates to computing devices. With current approaches, some devices that have authorized copies of software may miss important updates because the identity of those devices may be unknown to the relevant software vendors (e.g., because the users neglected to register those devices with the software vendors). However, with the techniques disclosed herein, whenever a software license is purchased for a registered device, that transaction may be recorded in a distributed ledger system. With access to up-to-date information about software products that have been licensed to registered devices, software vendors may be able to efficiently and accurately identify devices that have software products that are eligible for updates. Information in the global registry may similarly be used to deploy other types of features for devices and to facilitate other types of warranty and support services.

Providing a reliable source of information about registered computing devices may even have the effect of improving the overall performance of the registered computing devices themselves. For example, information in the global registry may be used to ensure that the software installed on a particular device is compatible with that device's hardware configuration, other software installed on the device, etc.

A distributed ledger system in accordance with the present disclosure may also generate unique forms of device configuration and consumption telemetry. For example, information about usage patterns for licensed software products on registered devices (e.g., how much a particular licensed software product has been used on a particular registered device over a defined time period) may be recorded in the distributed ledger system and made available to participating parties. This may facilitate greater trust and interaction between various entities who are involved in the production and maintenance of computing devices. Having access to a greater amount of device data and also being able to trust the reliability of that device data can lead to greater visibility and transparency into device data and software license entitlements shared among all participants in the distributed ledger system.

Enabling an irrefutable source of unique digital identity regarding registered computing devices may even improve the general effectiveness of activation of licensed software and redemption of services and entitlements on such computing devices. For example, unique device ID information in the global registry can be used to establish proof of genuine license and in turn allow activation of software itself with high fidelity. This could eliminate certain practices that are required with current approaches, such as the need for buying licenses in advance, maintaining an inventory of product keys, and returning unused keys at the end of month. Similarly, unique IDs in the global device registry can be used to track all associated entitlement offers to any given computing device and allow the end customers to redeem the entitlements at will anytime during the device lifecycle.

Creating a global device registry may also allow all participants to manage the changes in provenance of all registered computing devices on the network with high confidence which in turn may enable new types of interactions between entities that are not possible with known approaches. Today, hardware manufacturers and service providers don't have a way of establishing device provenance and lose all visibility into events during lifecycle of the device. For example, an original equipment manufacturer (OEM) could transfer ownership of the device to an enterprise customer and track that information on the global device registry, but still have access to hardware configuration changes and software updates long after the device leaves the manufacturing facility. A customer could choose to share ownership or designate certain responsibilities with select OEMs and service providers using the global registry. This approach empowers the owner of the device to accomplish more with less friction and enables all parties to have full transparency into the device lifecycle.

Figure 6:
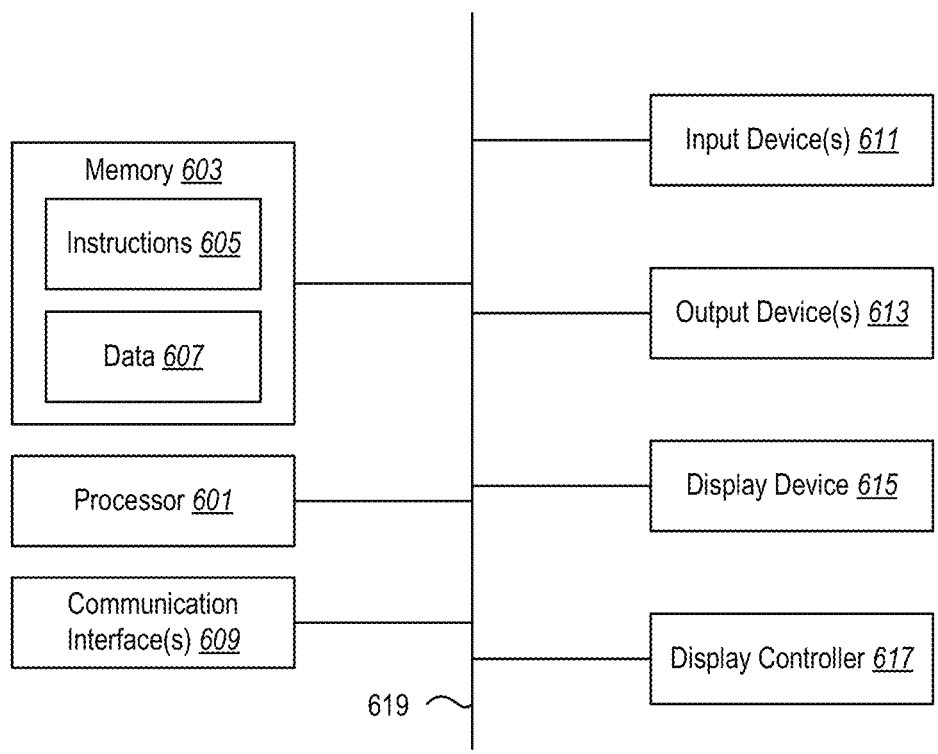
FIG. 6 illustrates certain components that may be included within a computer system that may be used to implement the various devices, components, and systems described herein.

FIG. 6 illustrates certain components that may be included within a computer system 600. One or more computer systems 600 may be used to implement the various devices, components, and systems described herein. For example, the computer system 600 may represent each node in a distributed ledger system's peer-to-peer network.

The computer system 600 includes a processor 601. The processor 601 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the steps, operations, actions, or other functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 602.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The computer system 600 is provided for purposes of example only, and should not be interpreted as limiting the scope of the present disclosure. A node in a distributed ledger system's peer-to-peer network may not include all of the components that are included in the computer system 600 shown in FIG. 6. For example, in some embodiments, a computer system 600 may not include input device(s) 611, output device(s) 613, a display device 615, or a display controller 617. Also, the configuration of the processor 601, memory 603, and communication interface(s) 609 depend on the particular distributed ledger system platform (e.g., Blockchain platform) that is being used for implementation.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A distributed ledger system that is configured to facilitate device management, comprising:
one or more processors;
memory in electronic communication with the one or more processors;
a device registry stored in the memory, the device registry comprising a plurality of device tokens representing a plurality of devices that have been registered with the distributed ledger system, wherein a device token corresponding to a device that has been registered with the distributed ledger system comprises:
logic that is configured to associate a software license token with the device token when a software license that has been registered with the distributed ledger system is purchased for the device; and
information identifying the software license token that is associated with the device token;
a software registry stored in the memory, the software registry comprising a plurality of software license tokens representing a plurality of software licenses that have been registered with the distributed ledger system;
transaction management components stored in the memory, the transaction management components being executable by the one or more processors to record, in a distributed ledger that is maintained by the distributed ledger system, device transaction information associated with the plurality of devices and software transaction information associated with the plurality of software licenses; and
access control components stored in the memory, the access control components being executable by the one or more processors to enforce access control policies related to the plurality of devices and the plurality of software licenses.

2. The distributed ledger system of claim 1, wherein:
the plurality of device tokens are executable by the one or more processors to perform one or more of changing ownership of the device tokens, recording the device transaction information in the device registry, and enforcing device access control policies associated with the device tokens; and
the plurality of software license tokens are executable by the one or more processors to perform one or more of changing ownership of the software license tokens, recording the software transaction information in the software registry, enforcing software access control policies associated with the software license tokens, and tracking consumption of licensed software products on the plurality of devices.

3. The distributed ledger system of claim 2, wherein recording the device transaction information and recording the software transaction information comprise associating the device token with a software license token in response to a purchase of a registered software license for a registered device, the registered device being associated with the device token, and the registered software license being associated with the software license token.

4. The distributed ledger system of claim 2, wherein changing the ownership of the device tokens comprises changing an owner identifier associated with the device token in response to a change in ownership of a registered device, the registered device being associated with the device token.

5. The distributed ledger system of claim 2, wherein changing the ownership of the software license tokens comprises changing an owner identifier associated with a software license token in response to a purchase of a registered software license, the registered software license being associated with the software license token.

6. The distributed ledger system of claim 2, wherein enforcing the device access control policies associated with the device tokens comprises at least one of:
restricting visibility of the device token within the distributed ledger system; or
defining one or more users who are authorized to modify attributes of the device token and record transactions associated with the device token.

7. The distributed ledger system of claim 2, wherein enforcing the software access control policies associated with the software license tokens comprises at least one of:
restricting visibility of a software license token within the distributed ledger system; or
defining one or more users who are authorized to modify attributes of the software license token and record transactions associated with the software license token.

8. The distributed ledger system of claim 1, further comprising:
an application programming interface corresponding to the distributed ledger system; and
a user interface that facilitates access to data maintained by the distributed ledger system via the application programming interface.

9. The distributed ledger system of claim 1, wherein the plurality of software license tokens are executable by the one or more processors to track consumption of licensed software products on the plurality of devices.

10. A method for facilitating device management through use of a distributed ledger system, comprising:
registering a plurality of devices with the distributed ledger system;
creating a plurality of device tokens for the plurality of devices, each device token representing a device that has been registered with the distributed ledger system;
registering a plurality of software licenses with the distributed ledger system;
creating a plurality of software license tokens for the plurality of software licenses, each software license token representing a software license that has been registered with the distributed ledger system;
recording device transaction information associated with the plurality of devices in a device registry;
recording software transaction information associated with the plurality of software licenses in a software registry;
determining that a software license that has been registered with the distributed ledger system has been purchased for a device that has been registered with the distributed ledger system;
identifying a device token in the device registry that corresponds to the device;
identifying a software license token in the software registry that corresponds to the software license;

adding information about the software license token to the device token; and enforcing access control policies related to the plurality of devices and the plurality of software licenses.

11. The method of claim 10, further comprising managing ownership of the plurality of device tokens, wherein managing the ownership of the plurality of device tokens comprises changing an owner identifier associated with the device token in response to a purchase of a registered device, the registered device being associated with the device token.

12. The method of claim 10, further comprising managing ownership of the plurality of software license tokens, wherein managing the ownership of the plurality of software license tokens comprises changing an owner identifier associated with a software license token in response to a purchase of a registered software license, the registered software license being associated with the software license token.

13. The method of claim 10, wherein enforcing the access control policies related to the plurality of devices comprises at least one of:

restricting visibility of the device token within the distributed ledger system; or defining one or more users who are authorized to modify attributes of the device token and record transactions associated with the device token.

14. The method of claim 10, wherein enforcing the access control policies related to the plurality of software licenses comprises at least one of:

restricting visibility of a software license token within the distributed ledger system; or defining one or more users who are authorized to modify attributes of the software license token and record transactions associated with the software license token.

15. The method of claim 10, wherein recording the device transaction information and recording the software transaction information comprise associating the device token with a software license token in response to a purchase of a registered software license for a registered device, the registered device being associated with the device token, and the registered software license being associated with the software license token.

16. The method of claim 10, further comprising:

exposing an application programming interface corresponding to the distributed ledger system; and providing a user interface that facilitates access to data maintained by the distributed ledger system via the application programming interface.

17. A non-transitory computer-readable medium having computer-executable instructions stored thereon that, when executed, cause one or more processors to perform operations comprising:

registering a plurality of devices with a distributed ledger system;

creating a plurality of device tokens for the plurality of devices, each device token representing a device that has been registered with the distributed ledger system;

registering a plurality of software licenses with the distributed ledger system;

creating a plurality of software license tokens for the plurality of software licenses, each software license token representing a software license that has been registered with the distributed ledger system;

recording device transaction information associated with the plurality of devices in a device registry;

recording software transaction information associated with the plurality of software licenses in a software registry;

determining that a software license that has been registered with the distributed ledger system has been purchased for a device that has been registered with the distributed ledger system;

identifying a device token in the device registry that corresponds to the device;

identifying a software license token in the software registry that corresponds to the software license;

adding information about the software license token to the device token; and enforcing access control policies related to the plurality of devices and the plurality of software licenses.

* * * * *